United States Patent
Lou

(10) Patent No.: US 7,096,421 B2
(45) Date of Patent: Aug. 22, 2006

(54) SYSTEM AND METHOD FOR COMPARING HASHED XML FILES

(75) Inventor: Edmund G. Lou, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 359 days.

(21) Appl. No.: 10/100,721

(22) Filed: Mar. 18, 2002

(65) Prior Publication Data

US 2003/0177442 A1    Sep. 18, 2003

(51) Int. Cl.
*G06F 15/00* (2006.01)
*G06F 7/00* (2006.01)

(52) U.S. Cl. .................. 715/513; 715/500; 715/501.1; 707/1; 707/101

(58) Field of Classification Search ............. 715/501.1, 715/513, 500; 707/1, 101; 713/176
See application file for complete search history.

(56) References Cited

U.S. PATENT DOCUMENTS

| | | | |
|---|---|---|---|
| 5,465,353 A * | 11/1995 | Hull et al. ...................... 707/5 |
| 6,098,071 A | 8/2000 | Aoyama et al. |
| 6,098,085 A * | 8/2000 | Blonder et al. ............. 715/531 |
| 6,115,802 A * | 9/2000 | Tock et al. ................... 711/216 |
| 6,324,555 B1 | 11/2001 | Sites .......................... 715/517 |
| 6,336,124 B1 | 1/2002 | Alam et al. |
| 6,502,112 B1 * | 12/2002 | Baisley ....................... 715/513 |
| 6,519,617 B1 | 2/2003 | Wanderski et al. |
| 6,684,204 B1 * | 1/2004 | Lal ................................ 707/3 |
| 6,687,873 B1 | 2/2004 | Ballantyne et al. |
| 6,718,516 B1 | 4/2004 | Claussen et al. |
| 2002/0029232 A1 | 3/2002 | Bobrow et al. |
| 2002/0038319 A1 * | 3/2002 | Yahagi ....................... 707/513 |
| 2002/0055932 A1 | 5/2002 | Wheeler et al. .......... 707/104.1 |
| 2002/0058520 A1 * | 5/2002 | Nakagawa .................. 455/456 |
| 2002/0073068 A1 * | 6/2002 | Guha ............................ 707/1 |
| 2002/0073091 A1 | 6/2002 | Jain et al. |
| 2002/0116371 A1 * | 8/2002 | Dodds et al. .................. 707/3 |
| 2002/0141449 A1 | 10/2002 | Johnson |
| 2002/0156761 A1 * | 10/2002 | Chen et al. .................... 707/1 |
| 2003/0023633 A1 * | 1/2003 | Ross ........................... 707/513 |
| 2003/0097650 A1 * | 5/2003 | Bahrs et al. ................. 717/124 |
| 2003/0120647 A1 * | 6/2003 | Aiken et al. ................... 707/3 |
| 2003/0145278 A1 | 7/2003 | Nielsen ....................... 715/511 |
| 2004/0205552 A1 * | 10/2004 | Vosburgh .................... 715/513 |
| 2004/0205565 A1 * | 10/2004 | Gupta ......................... 715/513 |

OTHER PUBLICATIONS

Riley et al., "Data abstraction and structure using C++", copyright 1994, pp. 563-570.*
U.S. Appl. No. 10/101,406, entitled System and Method for Comparing Parsed XML Files, filed on Mar. 18, 2002, Inventor: Edmund G. Lou. 33 Pages and 12 pages of drawing.
U.S. Appl. No. 10/079,119 entitled Method and Apparatus for a Real-Time XML Reporter, filed on Feb. 19, 2002. 29 Pages and 8 pages of drawings.
Brett McLaughlin, "Java and XML," O'Reilly and Associates, Sep. 6, 2000, 46-88.

(Continued)

*Primary Examiner*—William Bashore
*Assistant Examiner*—Thu V. Huynh
(74) *Attorney, Agent, or Firm*—Martine Penilla & Gencarella, LLP

(57) ABSTRACT

A system and method of comparing a first XML document and a second XML document includes hashing the first and the second XML documents. The first hashed XML document is compared to the second hashed XML document and a difference report is output.

18 Claims, 11 Drawing Sheets

OTHER PUBLICATIONS

"Report Generator," from http://web/archive.org/web/*/http://www.technovations.com/reportw.htm, Apr. 30, 2001, p. 1.

"Test Cases for Software Testing," from http://web/archive.org/web/*/htto://www.analysttool.com/testcase.html, May 26, 2001, p. 1.

Marc De Scheemaecker, "NanoXML: A Lightweight XML Parser," http://www.xml.com/pub/r/192, Apr. 30, 2000 p. 1.

"CVS—Concurrent Versioning System," http://www.gnu.org/software/cvs/manual/html_node/cvs_toc.html, Nov. 7, 1998, pp. 1-7.

Stephanie Fesler, "Using DOM to Traverse XML," http://www.onjava.com/pub/a/onjava/2001/02/08/com.html, Feb. 8, 2001, pp. 1-4 of 4, 1-7 of 7, and 1-5 of 5.

* cited by examiner

450

```xml
<?xml version="1.0" ?>
- <rootreport>
 - <toolreport>
     <testarea>Swing</testarea>
     <toolname>Stick</toolname>
     <tooldescription>Basher tool</tooldescription>
   - <testcase>
       <description>none</description>
       <result>Fail</result>
       <bugid>398434</bugid>
       <notes>This is rad</notes>
     </testcase>
  </toolreport>
</rootreport>
```

Figure 4B

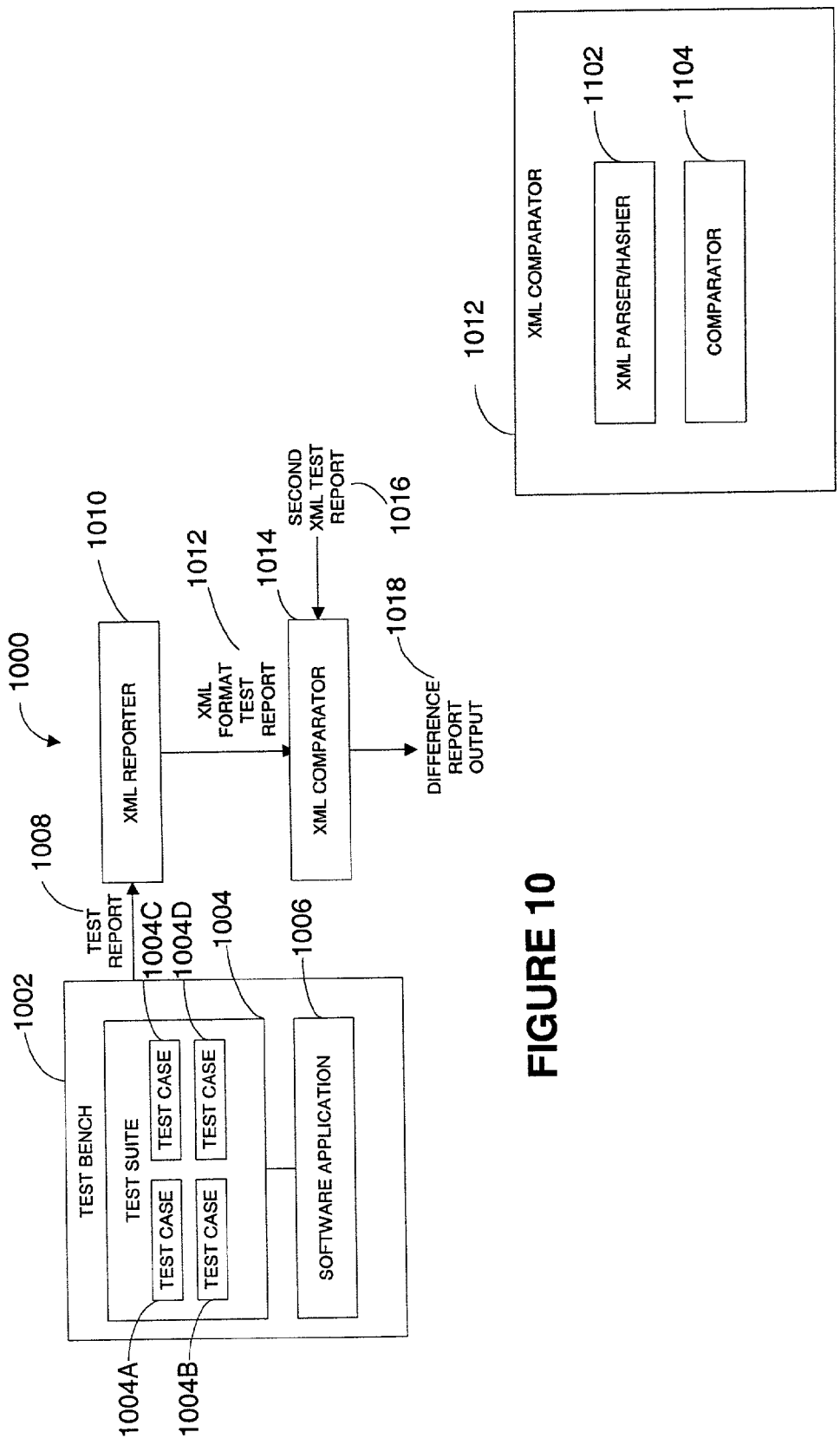

US 7,096,421 B2

SYSTEM AND METHOD FOR COMPARING HASHED XML FILES

CROSS REFERENCE TO RELATED APPLICATIONS

This application claims priority from U.S. patent application Ser. No. 10/079,119, filed on Feb. 19, 2002 and entitled "Method and Apparatus for a Real Time XML Reporter," and U.S. patent application Ser. No. 10/101,406, filed on Mar. 18, 2002 and entitled "System and Method for Comparing Parsed XML Files," which is incorporated herein by reference in its entirety.

BACKGROUND OF THE INVENTION

1. Field of the Invention

This invention relates generally to computer testing, and more particularly to comparing XML based test reports.

2. Description of the Related Art

Software applications typically undergo constant review and improvement, which verifies the functions of the software and updates the software to incorporate new features and functions. However, each new feature and error fix may cause addition errors. As such, test engineers generally apply a series of test cases, known as a test suite, to the application to test each new update and error fix. A typical test suite can include thousands of individual test cases.

For example, in a Java™ application, a test case generally includes an assertion, such as pushing a button, followed by an occurrence of a particular event. In addition, the test case validates the occurrence of the event, verifying whether the event occurs correctly. For example, a test case can verify the function of a "tone" button on an Internet web page application. When the tone button is pressed, a tone should be produced. The test case simulates a computer mouse dragging a cursor to the button, pressing the button, and then releasing the button. The test case then validates whether the tone was correctly produced. Finally, a test result is output to a test report, which includes at least one test result for each one of the test cases.

Often, test reports are output in a text format so a software test engineer can review the test results in a written form. However, unformatted text-based test reports can be difficult for a human engineer to read. To make test reports easier to read, test suites often output the test reports in a Hypertext Markup Language (HTML) format, rather than an unformatted text format. HTML format allows a user to view the data using a browser application, which renders the data easy for a human to read.

Conventional test applications typically use an HTML reporter to convert test results into HTML format. HTML surrounds data with tags that define how a browser should present the data to a user. Hence, an HTML test report file represents a view of the test result data, rather than the data itself. As such, an HTML test report file cannot easily be displayed in different views without severely altering the tags and other content of the HTML file. Thus, if a specific view of the test result data is needed, the new data view cannot be easily created without severely altering the HTML test report file.

Different users often require different views of the test report data. For example, a department manager may require a listing of test regressions, while an application designer may require a listing of all test failures. Using an HTML based test report file, these two data views generally cannot be easily created using the same HTML test report file. Creating these views typically requires the HTML test report file to be examined and manually altered to create new HTML files, which include only the information requested.

A test regression is when a test case fails in a first revision of the software (i.e., revision 1.0), the failure is corrected in a subsequent revision (i.e., revision 1.01) and then the same failure reoccurs in yet another subsequent revision (i.e., revision 2.0). A test regression can identify improvements or error fixes that caused problems that were previously fixed. Properly identifying a test regression can assist the software engineer to quickly identify the cause of the test regression. Unfortunately, a test engineer must access the historical knowledge base of all previous test results to accurately identify test regressions.

As test suites grow ever larger, the task of interpreting the information in the test report becomes more and more labor intensive. A typical test suite might include two thousand or more individual test cases. The test report can therefore include two thousand or more entries. Applying the test suite to a revision 1.01 of a software application outputs a revision 1.01 test report. The test engineer can then compare each of the approximately two thousand entries in the revision 1.01 test report to the corresponding entry in a previous revision (e.g., revision 1.0) test report. Manually comparing two or more test reports can be very labor intensive, often requiring many hours to review just one new test report. However, in the fast-paced, limited budget environment of a typical software development project, the number of hours available to evaluate a test report is limited.

Typically the test engineer desires to identify the differences between the revision 1.0 test report and the revision 1.01 test report. By identifying the differences, the test engineer can then track progress toward resolving software failures. The differences typically include any tests that have failed in revision 1.0 test but did not fail in revision 1.01. In addition, the differences may also include any tests that failed in revision 1.01 but did not fail in revision 1.0 test.

Comparing two test reports can be further complicated when the test suite is modified to include additional test cases. In such an instance, the test report comparison must first identify the common test cases and then only compare the results of the common test cases. Then the test cases that are not common must be individually examined to determine if the test cases failed or passed.

One approach to making comparison and analysis of test reports easier is to store the test reports in a database environment. However, storing the test reports in a database requires a database manager and a database administrator to function properly. A database manager and administrator can also complicate and delay the test result analysis as the database can only be viewed and accessed through the database manager.

In view of the foregoing, there is a need for techniques that compare data from test reports that is more user-friendly and requires fewer man-hours and less actual elapsed time.

SUMMARY OF THE INVENTION

Broadly speaking, the present invention fills these needs by providing a system and method for comparing hashed XML files. It should be appreciated that the present invention can be implemented in numerous ways, including as a process, an apparatus, a system, computer readable media, or a device. Several inventive embodiments of the present invention are described below.

One embodiment includes a system and method of comparing a first XML document and a second XML document that includes hashing the first and the second XML documents. The first hashed XML document is then compared to the second hashed XML document and a difference report is output.

In one embodiment, the system and method of comparing the first XML document and the second XML document includes hashing the first XML document using a first hashing function. Storing the hashed first XML document in a hash table. A tag is selected from a second XML document. The selected tag includes a corresponding description tag and a corresponding results tag. The corresponding description tag includes a corresponding description value. The corresponding results tag includes a corresponding results value. The selected tag is hashed. Hashing the selected tag can include hashing the corresponding description value to identify a location in a hash table.

In one embodiment, hashing the description value can also include determining if the identified location in the hash table includes a stored value. If the identified location in the hash table includes a stored value, the stored value is compared to the corresponding results value. If the stored value is not equal to the corresponding results value, the selected tag is output as a changed tag and the stored value is deleted from the hash table. If the identified location in the hash table does not include a stored value the selected tag is output as a new tag.

Hashing the description value can also include identifying a tag as a previous tag if the tag corresponds to a stored value that remains in the hash table. The previous tag can be output into the difference report.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

FIG. 4B shows an exemplary XML test report.

FIG. 6C shows an exemplary tree structure of an XML test report, such as the XML test report shown in FIG. 4B above.

FIG. 10 is a block diagram of an exemplary system for performing the methods described in FIGS. 3–9A above, in accordance with one embodiment of the present invention.

FIG. 11 is a block diagram of an XML comparator for comparing XML test reports, such as the XML comparator of FIG. 10 above, in accordance with one embodiment of the present invention.

DETAILED DESCRIPTION OF THE EXEMPLARY EMBODIMENTS

Figure 1:
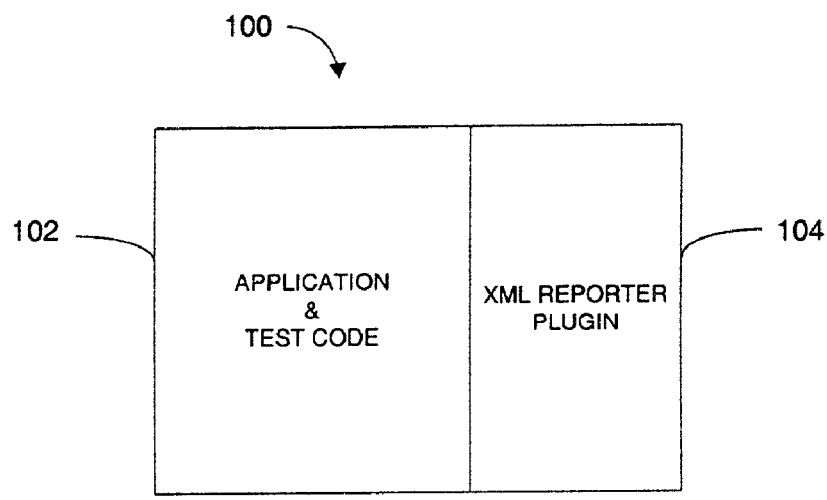
FIG. 1 is a block diagram showing an exemplary application testing configuration, in accordance with an embodiment of the present invention.

Several exemplary embodiments for comparing Extensible Markup Language (XML) files will now be described. It will be apparent to those skilled in the art that the present invention may be practiced without some or all of the specific details set forth herein. One embodiment includes comparing two XML formatted test reports to determine a difference report. The two XML reports are hashed and the hashed XML test reports are compared. Differences can be quickly determined and output in a difference report. Hashing the two XML reports allows comparison of XML test reports that have different orders.

Comparing two lists that have at least some of the same tags in common, even if the common tags occur in a different order, allows the comparison of test reports produced by similar but not identical test suites. Comparing two XML test reports as described above is different from comparing HTML formatted test reports. Because HTML has been developed as a visual presentation of information, HTML formatted test reports are typically compared for an exact match of the of the visual presentation format of the documents. For example, even a small change of spacing of indent could result in a difference between two HTML formatted test reports. Two XML test reports may have different visual presentations and still have identical tag-value pairings.

XML allows a user to include intelligence in the XML tags in that XML tags can be customized to a user's needs. XML also includes data that corresponds to the tags. The data can be extracted and manipulated. In one embodiment, each tag can represent a test case in a test suite and the data corresponding to the each tag includes the status (e.g., pass/fail) of the test case.

Comparing two (or more) XML formatted test reports allows a software engineer to quickly identify differences between the test case results. HTML formatted test reports cannot be similarly compared because the HTML test reports do not allow the test data to be linked to the tag as in an XML formatted test report.

A difference report includes the difference between two XML files such as a baseline XML test report (baseline report) and a new XML test report (new report). A baseline report can be any other XML test report that a new report would be compared to. In one instance, the baseline report can be the test report from revision 1.0 of a software application. The test report from version 1.0 was studied and understood by the test engineers so that the then current status of each of the test cases applied to revision 1.0 is known and can therefore be used as a baseline test report. The baseline test report can also include all previously occurring test case failures. A baseline test report could also include notes or documentation regarding when (e.g., which revision of the software application) each test case failure was discovered and when such a failure was corrected.

When a subsequent revision of the software application, revision 1.01, is produced and then tested. The test results from revision 1.01 are output in a new test report (revision 1.01 test report). One of the quickest methods to determine the status of each of the test cases applied to revision 1.01 is to compare the known status of the baseline report (e.g., revision 1.0 test report) to the new report. Any differences between the baseline test report and the new test reports can be used to determine the status of the new test report.

FIG. 1 is a block diagram showing an exemplary application testing configuration 100, in accordance with an embodiment of the present invention. The application testing configuration 100 includes an application program 102 that includes additional testing code. To test applications, test engineers often insert testing code directly into the application. The application is executed and the test results recorded. However, it should be noted that other testing techniques can be utilized with the embodiments of the present invention. For example, a separate test application can be developed that exercises the application under test. Generally, such test applications make function calls to the functions of the application under test to determine if proper events occur.

In addition to the application program 102, an XML reporter plug-in 104 is provided. A plug-in is auxiliary program that works with another software element to enhance its capability. For example, plug-ins are widely used in image editing programs to add a filter for some special effect. Plug-ins are also often added to Web browsers to enable them to support new types of content, such as audio and video.

The XML reporter plug-in 104 extends the application under test to provide a mechanism for writing test results to a test report file in XML format. XML is an open standard for describing data and is often used for defining data elements on a Web page and business-to-business documents. XML uses a similar tag structure as HTML. However, whereas HTML defines how elements are displayed, XML defines what those elements contain. Further, HTML uses predefined tags, while XML allows tags to be defined by the developer of the page. Thus, virtually any data items, such as test suites and individual tests, can be identified, allowing XML documents to function similar to database records. It should be noted that the XML reporter 104 can be embodied in formats other than a plug-in, as shown in FIG. 1. For example, the XML reporter can comprise a separate program that executes in parallel with the application being test. In such as case, the XML report can intercept write request by the application being tested, or be interfaced with the application, depending on the needs of the application test engineer.

Figure 2:
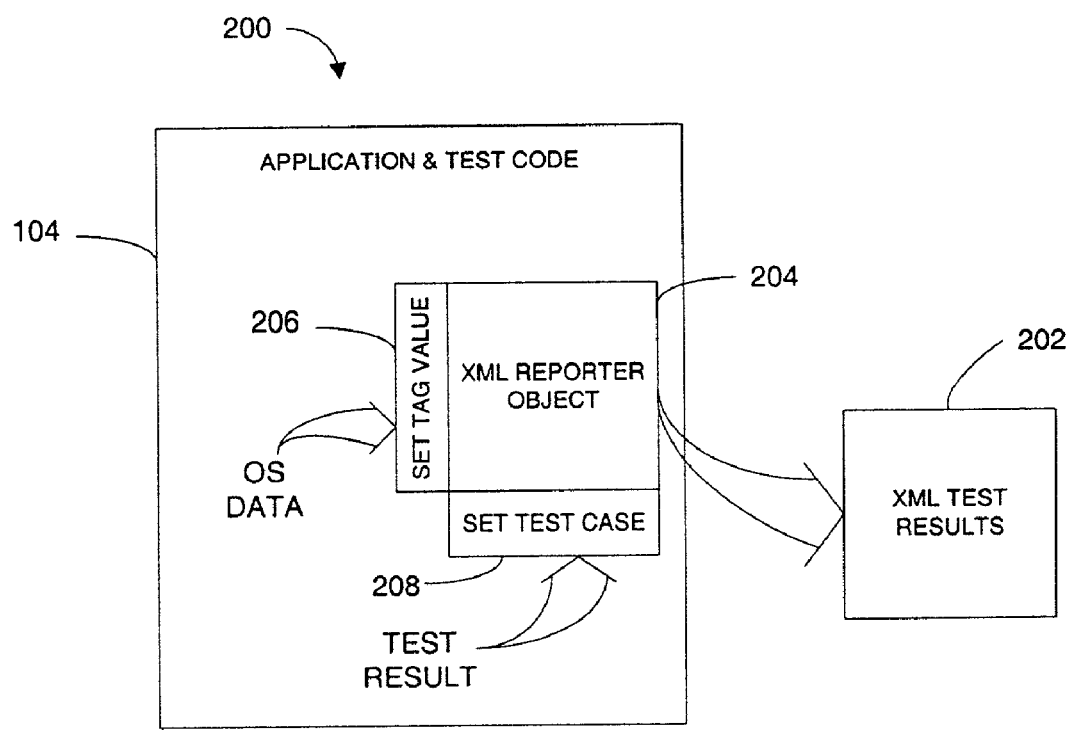
FIG. 2 is a block diagram showing an exemplary application testing system 200, in accordance with an embodiment of the present invention.

FIG. 2 is a block diagram showing an exemplary application testing system 200, in accordance with an embodiment of the present invention. The application testing system 200 includes the application 102 that is being tested and an XML test results file 202. As above, the testing code can be inserted directly into the application 104. However, it should be borne in mind that other testing techniques can be utilized with the embodiments of the present invention, as mentioned previously. In addition, the application 104 includes an XML reporter object 204 having a set tag value application program interface (API) 206 and a set test value API 208. As mentioned above, an XML reporter of the embodiments of the present invention can be implemented as a plug-in that extends the functionality of the application 104 being tested.

In one embodiment, the XML reporter plug-in provides an XML reporter class usable by the application 104. In this embodiment, the test code in the application 104 can create an XML object 204 that provides additional functions for creating the XML test results file 202. The XML reporter object 204 provides, in one embodiment, two interfaces for communicating with the application program 104, namely, the set tag value API 206 and a set test value API 208.

The set tag value API 206 provides a mechanism for writing simple values to the XML test report file 202. In particular, the set tag value API receives a key and a value from the application 104, and writes the received key and value to the XML test report file 202 in proper XML format. The key is the tag name that identifies the corresponding value, while the value is the actual data corresponding the test being performed on the application 104.

Figure 3:
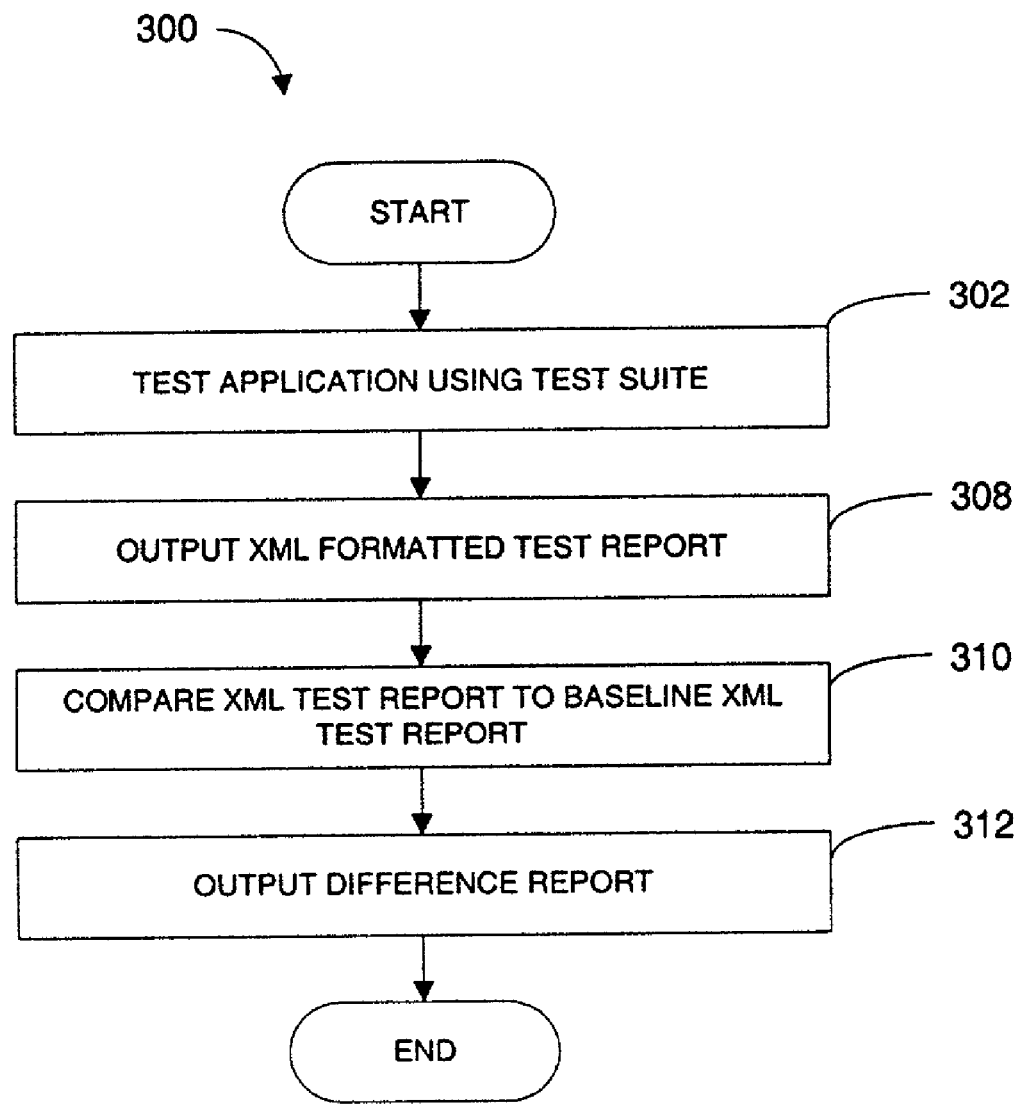
FIG. 3 is a flowchart diagram that illustrates a method performed in testing a software application, such as a Java™ software application, in accordance with one embodiment of the present invention.

FIG. 3 is a flowchart diagram that illustrates a method 300 performed in testing a software application, such as a Java™ software application, in accordance with one embodiment of the present invention. In operation 302, a test suite tests the Java™ software application. The results of the test are output in an XML format test report in operation 308. The new XML test report is compared to a baseline test report in operation 310. A difference report is output in operation 312.

Figure 4A:
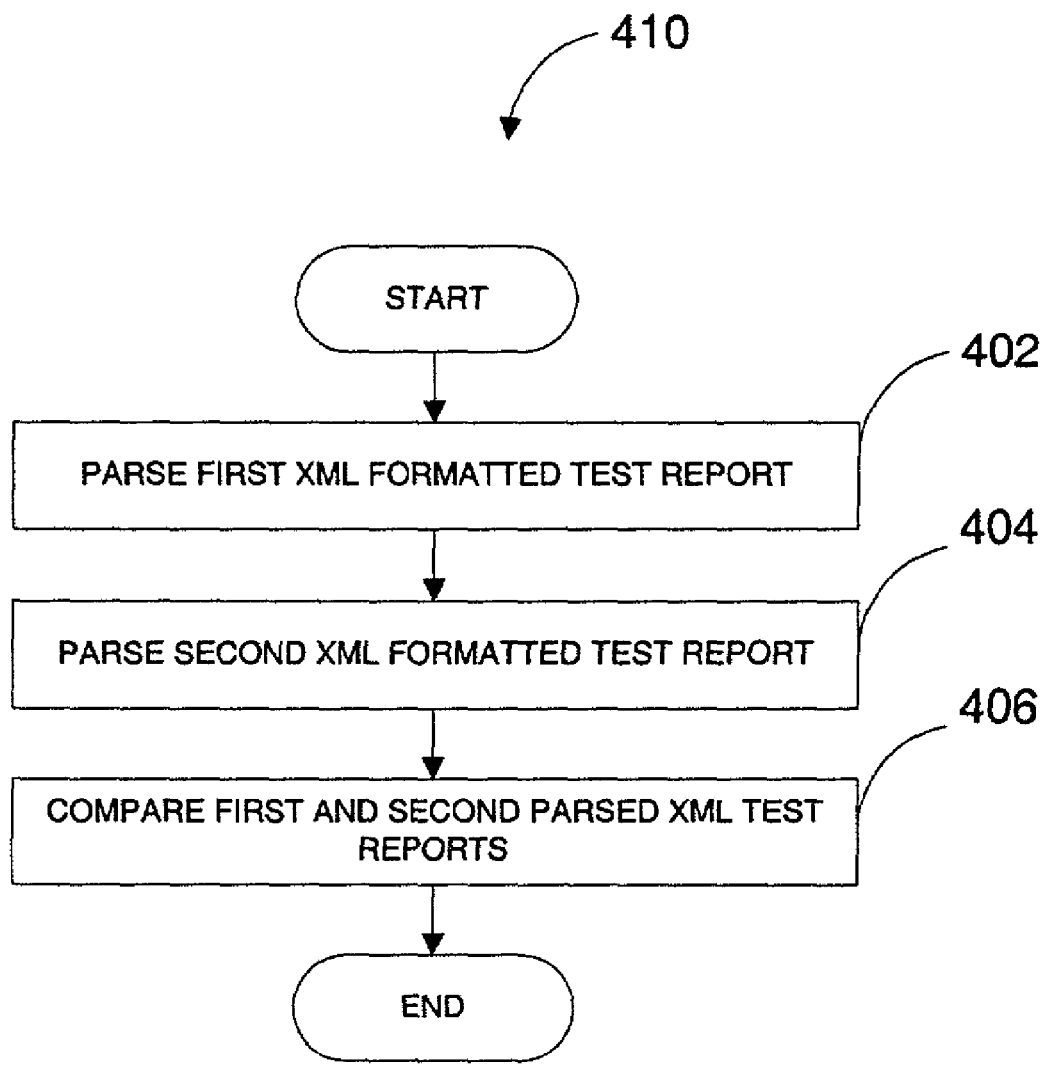
FIG. 4A is a flowchart diagram that illustrates a method performed in comparing the two XML test reports, such as in FIG. 3, in accordance with one embodiment of the present invention.

FIG. 4A is a flowchart diagram that illustrates a method performed in comparing the two XML test reports, such as in operation 310 of FIG. 3, in accordance with one embodiment of the present invention. In operation 402, a first XML formatted test report, such as the baseline test report, is parsed. In operation 404, a second XML formatted test report, such as the new test report, is parsed. The parsing can be accomplished in any one or more of several methods as will be discussed in more detail below. The parsed test reports are compared in operation 406.

In one embodiment, the XML test report includes XML tags. The XML tags represent a test case. The XML tags include a corresponding value. The corresponding value is a representation of the test results of the corresponding test case. For example, if the software application passed a test case, a tag is output including a value the represents "passed" (e.g., "pass", "1", etc.). Alternatively, the corresponding value could be another output such as a calculation of a result or an output of a particular function in the software application and/or test case.

FIG. 4B shows an exemplary XML test report 450. A tag such as the "result" tag has a value of "FAIL". Tag "result" represents a test case result and the value "FAIL" represents the results of the test case.

Figure 5:
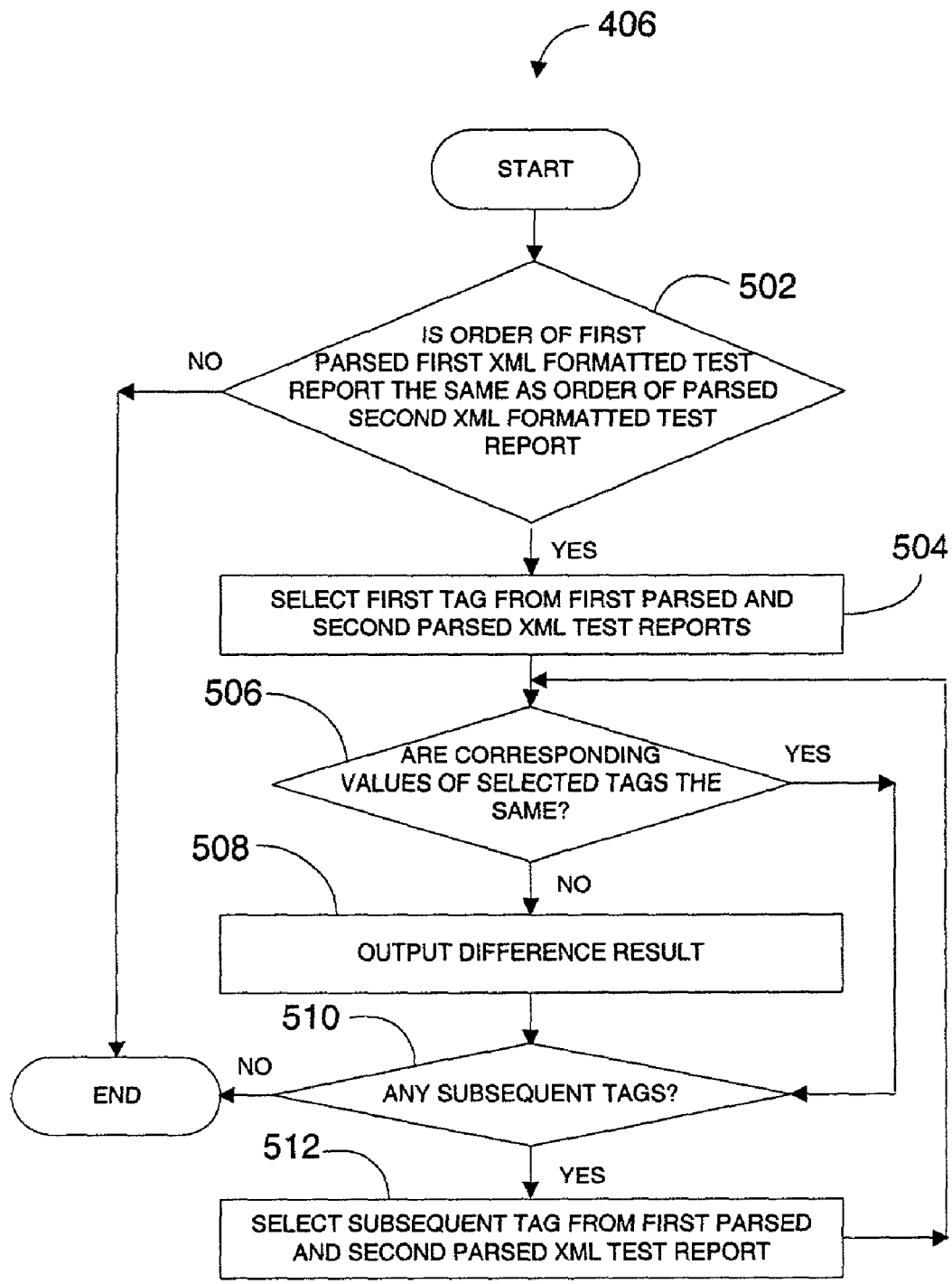
FIG. 5 is a flowchart diagram that illustrates a method perform ed in comparing the two parsed test reports, such as in FIG. 4A, in accordance with one embodiment of the present invention.

FIG. 5 is a flowchart diagram that illustrates a method performed in comparing the two parsed test reports, such as in operation 406 of FIG. 4A, in accordance with one embodiment of the present invention. The order of the parsed first and second test reports is compared in operation 502. If the order of the parsed first and second test reports is not the same, the operations end, as the two parsed test reports cannot be directly compared in this method. However, the two parsed test reports with different orders in operation 502 can be compared such as in a method described in FIG. 7, et seq. below. The two parsed test reports cannot be directly compared because the corresponding tags in both parsed test reports are compared. For example, if the fourth tag in the first parsed test report is "tagD" and the fourth tag in the second parsed test report is "tagE", then the fourth-occurring tags are not the same. Therefore, the fourth-occurring tags represent different test cases in each of the two, parsed test reports. Therefore, comparing the test results from different test cases would not identify test cases having different results in the first than in the second test report. If the order of the parsed first and second test reports is the same in operation 502, the operations continue in operation 504.

In one embodiment, the order of the first and second test reports is the same if the each of the tags from both test reports has the same description value and occur in the same order. For example, the order is the same if the tags in both parsed test reports are "tagA, tagB, tagC, tagD", in the respective order. Conversely, if the first parsed test report had an order of "tagA, tagB, tagC, tagD", and the second parsed test report had an order of "tagA, tagB, tagD, tagC", then the order is not the same because the order of occurrence of tagC and tagD are different. Similarly, if the first parsed test report has an order of "tagA, tagB, tagC, tagD", and the second parsed test report has an order of "tagA, tagB, tagE, tagD", then the order of the two, parsed reports is not the same because tagE and tagC are not the same tag (i.e., tagE and tagC have different description values).

In operation 504, a first tag (e.g., tagA) from both parsed test reports is selected. The selected tag has a first corresponding value in the first parsed test report and a second corresponding value in the second parsed test report. The first and second corresponding values of the selected tag are compared in operation 506. If the first and second corresponding values of the selected tag are not the same, then the result of the test case is different in each of the two test reports. A difference result is output in operation 508. If in operation 506, the first and second corresponding values of the selected tag are the same, then the test case has the same value in both of the two test reports. Therefore no change in status of the corresponding test case need be reported. Therefore, the operations continue at operation 510 to determine if there are any remaining tags in the first and second parsed test reports. If there are no remaining tags in the first and second parsed test reports, the operations end. If there are remaining tags in the first and second parsed test reports, a subsequent tag is selected in operation 512, and the operations continue in operation 506 described above.

Figure 6A:
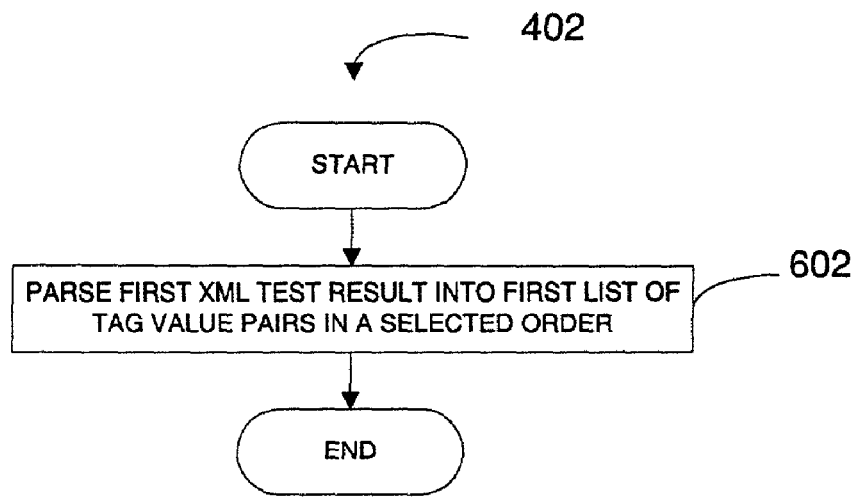
FIGS. 6A and 6B are flowchart diagrams that illustrate methods performed in parsing an XML test report, such as in FIG. 4A above, in accordance with one embodiment of the present invention.
Figure 6B:
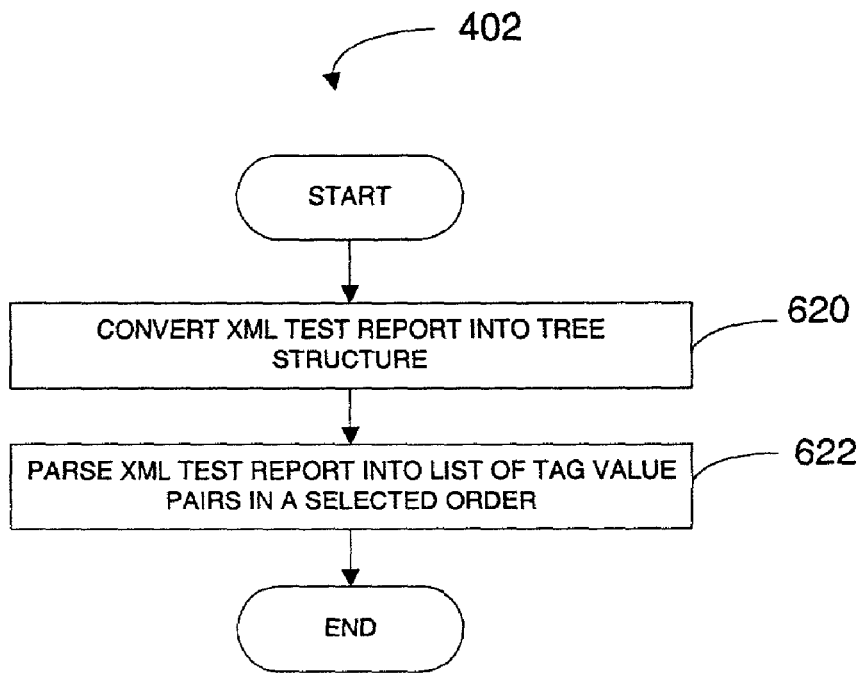

FIGS. 6A and 6B are flowchart diagrams that illustrate the operations performed in parsing an XML test report, such as in operation 402 of FIG. 4A above, in accordance with one embodiment of the present invention. In operation 602 of FIG. 6A, each XML formatted test report is parsed into a list of tag-value pairs in a selected order. The tags can be parsed in accordance with any particular order scheme, however the scheme should be constant for both test reports to be compared. In one instance, the order scheme can be in the order of occurrence in the XML document.

FIG. 6B illustrates another order scheme based upon a traversal method. In operation 620, the XML test report is converted to a tree structure. FIG. 6C shows an exemplary tree structure 650 of an XML test report, such as the XML test report 450 shown in FIG. 4B above. The tree structure 650 is a graphical representation of the hierarchical structure of the XML test report 450.

In operation 622 a traversal method is selected and applied to the tree structure 650 to parse the tree structure. Several traversal methods are known in the art. One such traversal method is a pre-order traversal. Applying a pre-order traversal to the above example provides rootreport, toolreport, testarea, toolname, tooldescription, testcase, description, result, bugid, notes. Another traversal method in an in-order traversal. An in-order traversal provides testarea, toolreport, toolname, tooldescription, description, testcase, result, bugid, notes, rootreport. Yet another traversal method is a post-order traversal, which provides testarea, toolname, tooldescription, description, result, bugid, notes, testcase, toolreport, rootreport. Other traversal methods could also be used. The traversal method is not critical. However, the resulting order of the parsed tree structure should be consistent.

The methods described in FIGS. 3–6C above can also be used to identify a test regression. For example, if a baseline test report that includes all previously occurring errors/failures is used, comparing the new test report to the baseline can identify any errors/failures that are common.

In an alternative embodiment, the tags from the second test report can be compared to the corresponding tags in the first test report, as the tags from the second test report are parsed. For example, the first test report is fully parsed, as described above, to create a list of tag-value pairs, in order. A first occurring tag is selected from the second test report. The selected tag and the corresponding value are parsed from the second test report. The parsed selected tag is compared to the first tag from the parsed first test report. Subsequent tags are selected and parsed from the second test report and compared to a corresponding tag from the parsed first test report. In this method, the comparison can occur in near real time to provide very rapid comparison processing.

As discussed above, if the order of the two parsed test reports is not the same, the operations described in FIGS. 3–6B above cannot be used to compare the test reports. Often the test suite will be updated to incorporate new tests and possibly change the order of current test cases. If a first test suite (i.e., the test suite prior to modification) and a second test suite (i.e., the test suite including the modifications) are used to test the same revision of a software application, the first test report may not be in the same order as the second test report. Therefore, the operations described in FIGS. 3–6B above may not be suitable for comparing a test report from one test suite and a test report from the same test suite that has been modified. If both the test suite and the software application under test are revised, the resulting test report can be in a different order and have different test case results. Therefore such a resulting test report cannot be easily compared to a previous test report using the operations described in FIGS. 3–6C above.

When the test suite changes, there are three types of differences that must be identified. One type of difference includes identifying new test cases in the new test suite. A new test case is a test case that is included in the new test suite that is not included in the previous test suite. The results of the new test cases must be identified however the results of the new test cases may or may not be comparable to any previous test case results. Another type of difference includes identifying discontinued test cases. A discontinued test case is a test case that is included in the previous test suite and not included in the new test suite. Results of discontinued test cases can be useful in confirming the results of new test cases that may be similar to the discontinued test case. Yet another difference type includes the common test cases that are common to both test suites. Identifying the common test cases allow the common test cases that have different results in the two test suites to be accurately identified.

Figure 7:
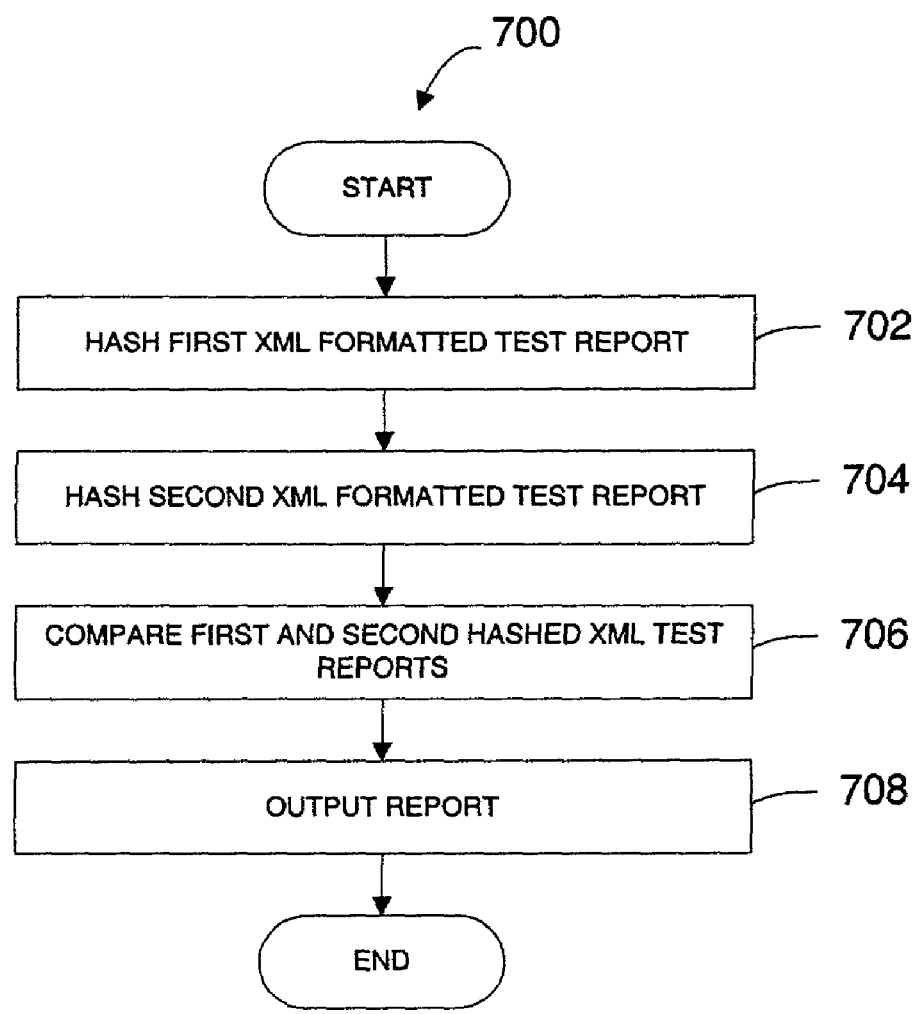
FIG. 7 is a flowchart diagram that illustrates a method performed in comparing two test reports having equal or unequal orders, in accordance with one embodiment of the present invention.

FIG. 7 is a flowchart diagram that illustrates the operations 700 performed in comparing two test reports having equal or unequal orders, in accordance with one embodiment of the present invention. In operation 702, a first XML formatted test report, such as the baseline test report, is hashed. In operation 704, a second XML formatted test report, such as the new test report, is hashed. The hashing can be accomplished in any one or more of several methods, which are well known in the art. The hashed test reports are compared in operation 706. A report of the differences between the hashed test reports is output in operation 708.

Figure 8:
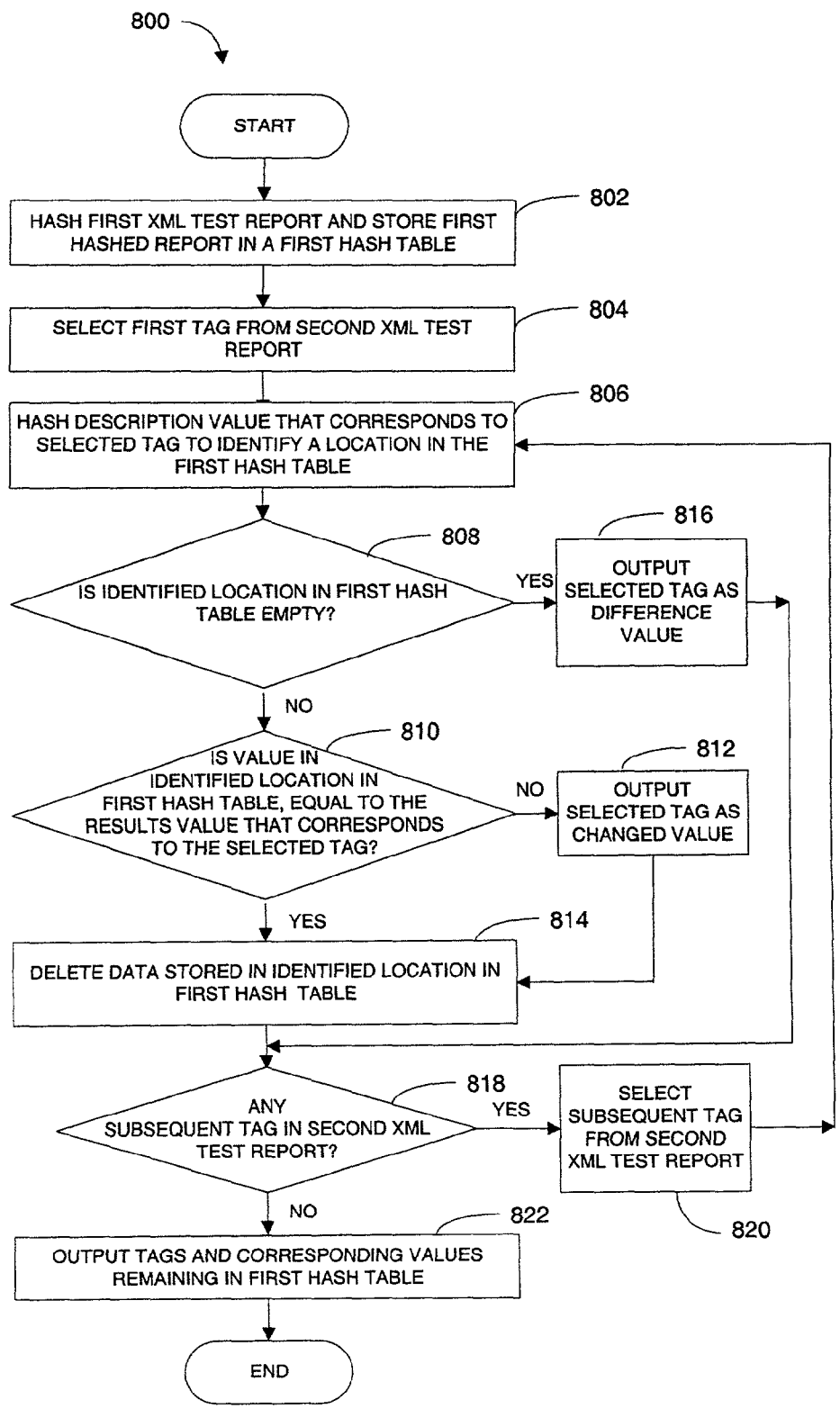
FIG. 8 is a flowchart diagram that illustrates a method performed for comparing test reports having equal or unequal orders, in accordance with one embodiment of the present invention.

FIG. 8 is a flowchart diagram that illustrates a method 800 performed for comparing test reports having equal or unequal orders, in accordance with one embodiment of the present invention. In operation 802, the first test report (i.e., the baseline test report) is hashed and stored in a first hash table. In one embodiment, the description value of a tag is selected as the key value used to identify a unique location in a hash table. For example a hash function is applied to the description value of the tag and the hashed description value provides a unique hashcode. The hashcode is used to identify a location in a hash table. The corresponding result value of the tag is stored in the identified location in the hash table. The description value of the tag optionally, may be stored in the hash table. A hash function is used because a hash function is designed in such a way as to generate a unique hashcode for the description value of each tag. The remaining tags in the first test report are similarly hashed and stored in the hash table.

In operation 804, a first tag, that represents a first test case from the second test report, is selected. The selected tag includes several corresponding tags such as a description tag and a results tag. The description tag includes a value that describes the test. By way of example, the value of the description tag can be "mousebuttontest". The results tag includes a results value that identifies the results of the test (e.g., pass, fail, 1, 0, or other test result output value). The value of the description tag that corresponds to the selected tag is used as a key value, in one embodiment. The value of the description tag that corresponds to the selected tag is hashed in operation 806 to create a first hashcode. In one embodiment, the same hash function is used to hash both the first and second test reports.

In operation 808, the location in the hash table that is identified by the first hashcode is checked. If the identified location is empty, the selected tag represents a test case that is included in the second test suite (e.g., the new test suite) but is not present in the first test suite (e.g., the baseline test suite) and therefore, the test case is a new test case. If the identified location is empty, the description tag and the value of the results tag that correspond to the selected tag are output in operation 816. The operations continue in operation 818 as described below. If the identified location in the hash table is not empty in operation 808, the selected tag does not represent a new test case but rather represents a common test case that is common to both the first test report and the second test report. If the selected tag represents a common test case the process continues in operation 810.

In operation 810, the value stored in the identified location in the hash table is compared to the corresponding results value of the selected tag. If the results value corresponding to the selected tag is not equal to the value in the identified location, the process continues in operation 812 and therefore the results of the common test case are different in the second report than in the first test report.

In operation 812, the description tag corresponding to the selected tag is output and identified as having a changed value. The changed value output in operation 812 represents a test case that is common between the first and second test suites and has a different value in the first test report (e.g., the baseline test report) than in the second test report (e.g., the new test report). In one embodiment, the value that is stored in the identified location in the hash table can also be output in operation 812. The process continues in operation 814.

Returning to operation 810, if the value of the selected tag is equal to the value in the identified location in the hash table, the common test case has the same value in both the first test report and the second test report. If the common test case has the same value in both the first test report and the second test report, the process continues in operation 814. In operation 814, the data (i.e., the corresponding results value) is deleted from the identified location in the hash table and the process continues in operation 818.

In operation 818, the second XML test report is examined to determine if there is a tag subsequent to the selected tag in the second test report. If a subsequent tag is available in the second test report, the subsequent tag is selected in operation 820 and the process continues in operation 806 as described above. If a subsequent tag is not available in the second test report in operation 818, then the process continues with operation 822. In operation 822, any values and the corresponding description tags that remain in the hash table, are output in operation 822 and the process ends. In one embodiment, the description tags that are output in operation 822 represent the test cases that were included in the first test suite (e.g., the baseline test suite) but were not included in the second test suite (e.g., the new test suite).

In an alternative embodiment, the second XML test report is fully hashed to create a second hash table. The first and second hash tables are compared as described above.

Figure 9A:
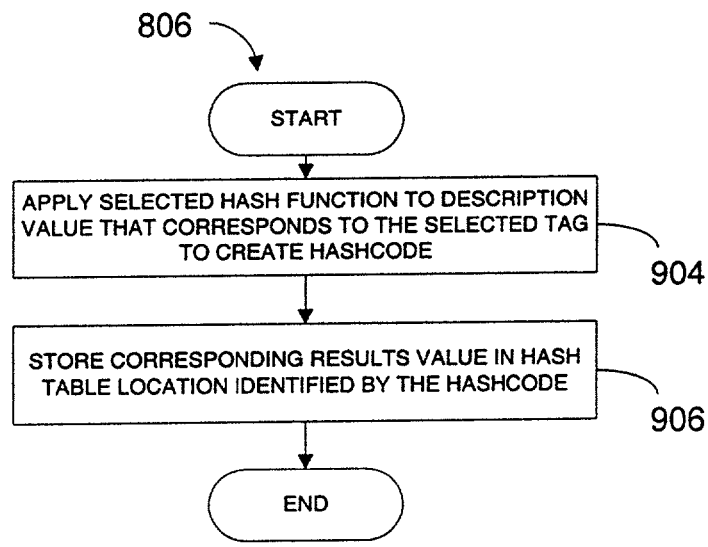
FIG. 9A is a flowchart diagram that illustrates a method performed in hashing a selected tag, such as in FIG. 8, in accordance with one embodiment of the present invention.

FIG. 9A is a flowchart diagram that illustrates a method performed in hashing a selected tag, such as in operation 806 of FIG. 8, in accordance with one embodiment of the present invention. In operation 904, a selected hash function is applied to a corresponding description tag of the selected tag to create a corresponding hashcode. The corresponding hashcode identifies a location (e.g., an address) in a hash table. In operation 906, the corresponding results value is stored in the identified location. In operation 906, the selected tag and/or the corresponding description tag can also be stored in the hash table.

Figure 9B:
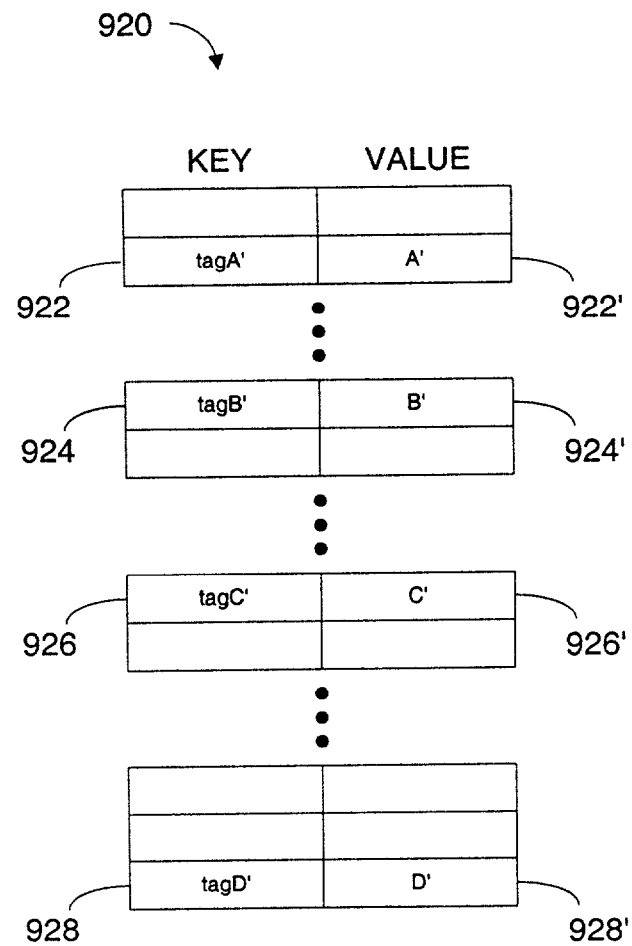
FIG. 9B shows one example of a XML test report stored in a hash table 920 in accordance with one embodiment.

FIG. 9B shows one example of a XML test report stored in a hash table 920 in accordance with one embodiment. A first XML formatted test report includes tagA, tagB, tagC, tagD and the corresponding description tags tagA ', tagB', tagC', tagD' and results values A', B', C', D'. Applying a hashing function to tagA' yields a hashcodeA that identifies a location 922 and a corresponding value location 922' in a hash table. TagA' and value A' are stored in locations 922 and 922', respectively. Similarly, tagB', tagC', tagD' are hashed to produce respective hashcodeB', hashcodeC', hashcodeD', which identify respective locations 924, 926, 928. TagB', tagC' and tagD' are stored in locations 924, 926, 928, respectively, and corresponding values B', C', D' are stored in locations 924', 926', 928', respectively. The locations 922, 924, 926, 928 may or may not be contiguous. The description tags (e.g., tagA', tagB', tagC', tagD') are used as the key term to identify a unique location in the hash table 920 in which the values (e.g., A', B', C', D') may be stored. Alternatively, the hashcodes (e.g., hashcodeA', hashcodeB', hashcodeC', hashcodeD') can be used to directly identify locations 922', 924', 926', 928' where corresponding values A', B', C', D' are stored. In one embodiment, the description tags (e.g., tagA', tagB', tagC', tagD') may not be required to be stored in the hash table because a hashed description tag identifies a location for the value that corresponds to the hashed tag.

FIG. 10 is a block diagram of an exemplary system for performing the methods described in FIGS. 3–9A above, in accordance with one embodiment of the present invention. A test bench 1002 includes at least one test suite 1004. The test suite 1004 includes several test cases 1004A–D. A software application 1006 to be tested is input or included in the test suite 1004. Alternatively, the test suite 1004 can be included in the software application 1006. As the test suite 1004 tests the software application 1006, the test bench 1002 outputs a test report 1008. The test bench 1002 is coupled to an XML reporter 1008. The test report 1008 is input to the XML reporter 1010. The XML reporter 1010 formats the test report 1008 into an XML formatted test report 1012. The XML reporter 1010 is coupled to an XML comparator 1014. The XML formatted test report 1012 is input to the XML comparator 1014. Another XML formatted test report 1016 is also input to the XML comparator 1014. The two XML test reports 1012, 1016 are compared in the XML comparator 1014 to produce a difference report 1018.

FIG. 11 is a block diagram of an XML comparator for comparing XML test reports, such as the XML comparator 1014 of FIG. 10 above, in accordance with one embodiment of the present invention. The XML comparator 1012 includes an XML parser and/or and XML hasher 1102 for parsing and/or hashing an XML test report. The parser 1102 can include a Java™ XML parser. The XML comparator 1012 also includes a comparator 1104 for comparing the parsed and/or hashed XML test reports.

Any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations. An exemplary structure for the invention is described below.

Figure 12:
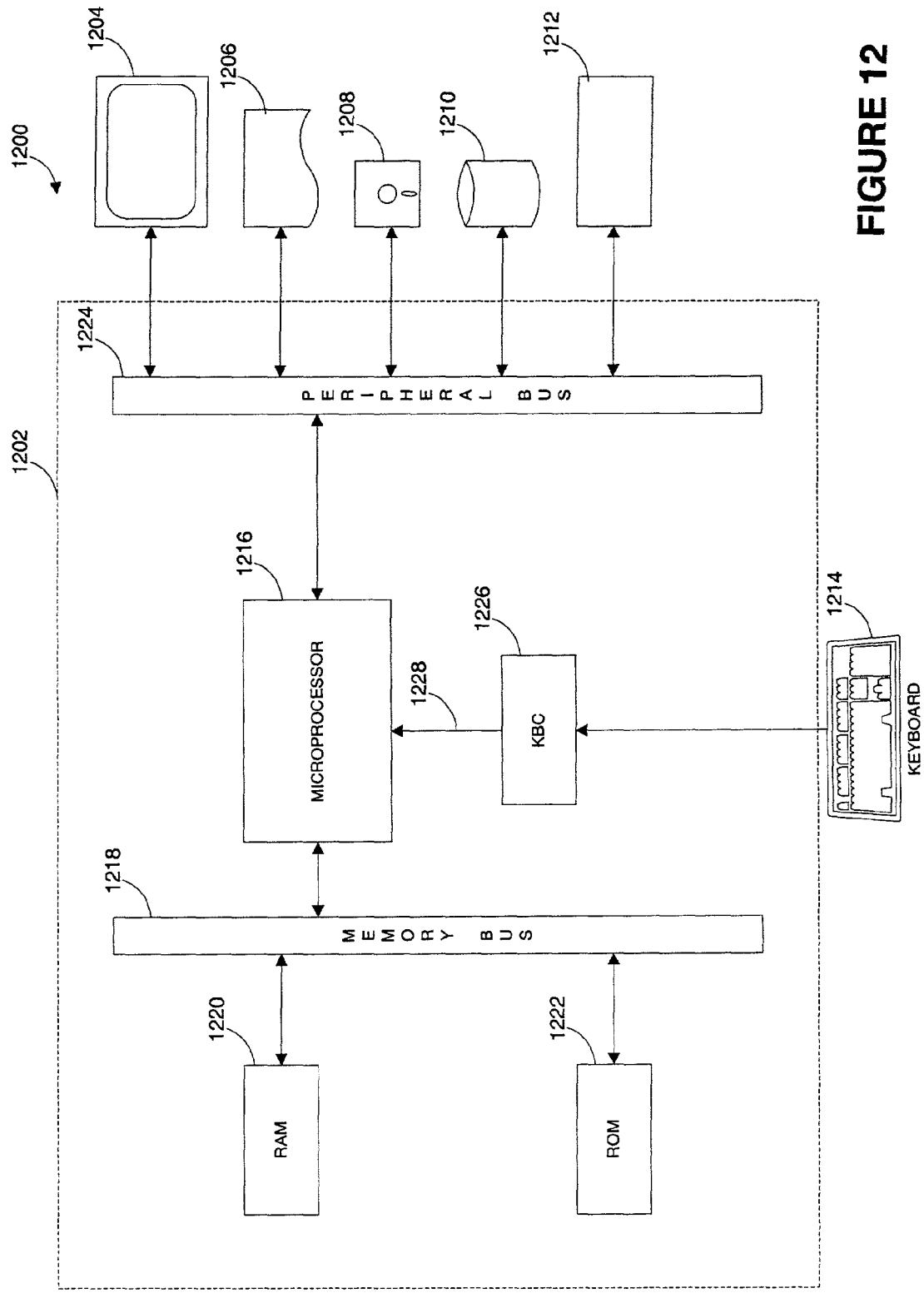
FIG. 12 is a block diagram of an exemplary computer system for carrying out the processing according to the invention.

FIG. 12 is a block diagram of an exemplary computer system 1200 for carrying out the processing according to the invention. The computer system 1200 includes a digital computer 1202, a display screen (or monitor) 1204, a printer 1206, a floppy disk drive 1208, a hard disk drive 1210, a network interface 1212, and a keyboard 1214. The digital computer 1202 includes a microprocessor 1216, a memory bus 1218, random access memory (RAM) 1220, read only memory (ROM) 1222, a peripheral bus 1224, and a keyboard controller (KBC) 1226. The digital computer 1202 can be a personal computer (such as an IBM compatible personal computer, a Macintosh computer or Macintosh compatible computer), a workstation computer (such as a Sun Microsystems or Hewlett-Packard workstation), or some other type of computer.

The microprocessor 1216 is a general-purpose digital processor, which controls the operation of the computer system 1200. The microprocessor 1216 can be a single-chip processor or can be implemented with multiple components. Using instructions retrieved from memory, the microprocessor 1216 controls the reception and manipulation of input data and the output and display of data on output devices.

The memory bus 1218 is used by the microprocessor 1216 to access the RAM 1220 and the ROM 1222. The RAM 1220 is used by the microprocessor 1216 as a general storage area and as scratch-pad memory, and can also be used to store input data and processed data. The ROM 1222 can be used to store instructions or program code followed by the microprocessor 1216 as well as other data.

The peripheral bus 1224 is used to access the input, output, and storage devices used by the digital computer 1202. In the described embodiment, these devices include the display screen 1204, the printer device 1206, the floppy disk drive 1208, the hard disk drive 1210, and the network interface 1212. The keyboard controller 1226 is used to receive input from keyboard 1214 and send decoded symbols for each pressed key to microprocessor 1216 over bus 1228.

The display screen 1204 is an output device that displays images of data provided by the microprocessor 1216 via the peripheral bus 1224 or provided by other components in the computer system 1200. The printer device 1206, when operating as a printer provides an image on a sheet of paper or a similar surface. Other output devices such as a plotter, typesetter, etc. can be used in place of, or in addition to, the printer device 1206.

The floppy disk drive 1208 and the hard disk drive 1210 can be used to store various types of data. The floppy disk drive 1208 facilitates transporting such data to other computer systems, and hard disk drive 1210 permits fast access to large amounts of stored data.

The microprocessor 1216 together with an operating system operate to execute computer code and produce and use data. The computer code and data may reside on the RAM 1220, the ROM 1222, or the hard disk drive 1210. The computer code and data could also reside on a removable program medium and loaded or installed onto the computer system 1200 when needed. Removable program media include, for example, CD-ROM, PC-CARD, floppy disk and magnetic tape.

The network interface 1212 is used to send and receive data over a network connected to other computer systems. An interface card or similar device and appropriate software implemented by the microprocessor 1216 can be used to connect the computer system 1200 to an existing network and transfer data according to standard protocols.

The keyboard 1214 is used by a user to input commands and other instructions to the computer system 1200. Other types of user input devices can also be used in conjunction with the present invention. For example, pointing devices such as a computer mouse, a track ball, a stylus, or a tablet can be used to manipulate a pointer on a screen of a general-purpose computer.

Although the present invention mainly describes exemplary embodiments of a distributed test framework system designed to execute a test suite, it must be understood by one having ordinary skill in the art that the distributed processing framework of the present invention can be implemented to run any computer process.

With the above embodiments in mind, it should be understood that the invention might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

The invention can also be embodied as computer readable code on a computer readable medium. The computer readable medium is any data storage device that can store data, which can be thereafter, be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion.

It will be further appreciated that the instructions represented by the operations in FIGS. 3–9 are not required to be performed in the order illustrated, and that all the processing represented by the operations may not be necessary to practice the invention. Further, the processes described in FIGS. 3–9 can also be implemented in software stored in any one of or combinations of the RAM 1220, the ROM 1222, or the hard disk drive 1210.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

The invention claimed is:

1. A computer implemented method of comparing a first XML document and a second XML document comprising:
   hashing a first XML document, wherein the first XML document includes a plurality of first tags, and hashing the first XML document includes hashing each one of the plurality of first tags including:
      selecting one of the plurality of first tags from the first XML document, wherein the selected first tag includes a corresponding description value and a corresponding results value; and
      hashing the corresponding description value of the selected first tag to identify a corresponding unique location in a hash table;
   storing at least one of the results value and the description value in the identified corresponding unique location in the hash table for each one of the plurality of first tags;
   hashing a second XML document, wherein the second XML document includes a plurality of second tags, wherein the plurality of first tags has a corresponding first order and the plurality of second tags has a corresponding second order, the first order is not equal to the second order, including hashing the corresponding second description value from a corresponding description tag included in the selected second tag wherein the hashed second description value identifies a corresponding unique second location in the hash table wherein hashing the corresponding second description value includes:
      determining if the corresponding unique second identified location in the hash table includes a stored value, wherein if the corresponding unique second identified location in the hash table includes a stored value, then:
         comparing the stored value to the corresponding second results value of a corresponding results tag included in the selected second tag;
         outputting the selected second tag as a changed tag, if the stored value is not equal to the corresponding second results value; and
         deleting the stored value from the corresponding unique second identified location in the hash table; and
      wherein if the corresponding unique second identified location in the hash table does not include a stored value, then outputting the selected second tag as a new tag;
   comparing the first hashed XML document and the second hashed XML document; and
   outputting a difference report.

2. The computer implemented method in claim 1, wherein outputting the difference report includes:
   outputting a corresponding difference result as each one of the plurality of second tags from the second XML document are hashed.

3. A computer implemented method of comparing a first XML document and a second XML document comprising:
   hashing a first XML document using a first hashing function, wherein the first XML document includes a plurality of first tags, and hashing the first XML document includes hashing each one of the plurality of first tags including:
      selecting one of the plurality of first tags from the first XML document, wherein the selected first tag includes a corresponding first description value and a corresponding first results value; and
      hashing the corresponding first description value of the selected first tag to identify a corresponding unique first location in a hash table;
   storing the hashed first XML document in the hash table including storing the first results value in the identified corresponding unique first location in the hash table for each one of the plurality of first tags in the first XML document;
   selecting one of the plurality of second tags from a second XML document, wherein the plurality of first tags has a corresponding first order and the plurality of second tags has a corresponding second order, the first order is not equal to the second order, wherein the selected second tag includes a corresponding second description value and a corresponding second results value; and
   hashing the selected second tag from the second XML document, including hashing the corresponding second description value from a corresponding description tag included in the selected second tag wherein the hashed second description value identifies a corresponding unique second location in the hash table wherein hashing the corresponding second description value includes:
      determining if the corresponding unique second identified location in the hash table includes a stored value, wherein if the corresponding unique second identified location in the hash table includes a stored value, then:
         comparing the stored value to the corresponding second results value of a corresponding results tag included in the selected second tag;

outputting the selected second tag as a changed tag, if the stored value is not equal to the corresponding second results value; and deleting the stored value from the corresponding unique second identified location in the hash table; and wherein if the corresponding unique second identified location in the hash table does not include a stored value, then outputting the selected second tag as a new tag.

4. The computer implemented method of claim 3 wherein the changed tag and the new tag are output in a difference report.

5. The computer implemented method of claim 4, wherein the difference report includes an XML document.

6. The computer implemented method of claim 3, further comprising:

identifying a tag as a previous tag if the tag corresponds to a stored value that remains in the hash table; and outputting the previous tag into the difference report.

7. The computer implemented method of claim 3, wherein outputting a tag includes outputting a corresponding results value of the tag.

8. The computer implemented method of claim 3, further comprising:

determining if any subsequent second tags are available in the second XML document, wherein if any subsequent second tags are available in the second XML document then:

selecting the subsequent second tag; and hashing the selected second tag.

9. The computer implemented method of claim 3, wherein the first XML document is a baseline XML test report.

10. The computer implemented method of claim 3, wherein the first XML document is an XML test report of a first version of a software application under test and wherein the second XML document is an XML test report of a subsequent version of the software application under test.

11. The computer implemented method of claim 3, wherein first XML document is an XML test report output from a first test suite testing a first version of a software application under test and wherein the second XML document is an XML test report output from a second test suite testing the first version of the software application under test.

12. The computer implemented method of claim 3, wherein storing the hashed first XML document in a hash table including storing the first results value and the description value in the identified corresponding unique first location in the hash table for each one of the plurality of first tags in the first XML document.

13. The computer implemented method of claim 12, wherein hashing the corresponding second description value further includes:

determining if the corresponding unique second identified location in the hash tables includes a stored description value and a stored results value, wherein if the corresponding unique second identified location in the hash table includes a stored description value and a stored results value, then comparing the stored description value and the stored results to the corresponding second description value and the corresponding second results value.

14. An XML comparator comprising:

a processor; and a memory system coupled to the processor, wherein the memory system includes instructions executable by the processor to:

hash a first XML document using a first hashing function, wherein the first XML document includes a plurality of first tags, and hashing the first XML document includes hashing each one of the plurality of first tags including:

selecting one of the plurality of first tags from the first XML document, wherein the selected first tag includes a corresponding first description value and a corresponding first results value; and hashing the corresponding first description value of the selected tag to identify a corresponding unique first location in a hash table;

store the hashed first XML document in a hash table including storing the first results value in the identified corresponding unique first location in the hash table for each one of the plurality of tags in the first XML document;

select one of a second plurality of second tags from a second XML document, wherein the plurality of first tags has a corresponding first order and the plurality of second tags has a corresponding second order, the first order is not equal to the second order, wherein the selected second tag includes a corresponding second description value and a corresponding second results value; and hash the selected second tag from the second XML document, including hashing the corresponding second description value from a corresponding description tag included in the selected second tag wherein the hashed second description value identifies a corresponding unique second location in the hash table wherein hashing the second description value includes:

determining if the corresponding unique second identified location in the hash table includes a stored value, wherein if the corresponding unique second identified location in the hash table includes a stored value, then:

comparing the stored value to the corresponding second results value of a corresponding results tag included in the selected second tag;

outputting the selected second tag as a changed tag, if the stored value is not equal to the corresponding second results value; and deleting the stored value from the corresponding unique second identified location in the hash table; and wherein if the corresponding unique second identified location in the hash table does not include a stored value, then outputting the selected second tag as a new tag.

15. The XML comparator of claim 14, wherein the XML comparator is coupled to a test bench.

16. The XML comparator of claim 15, wherein the test bench includes:

a software application; and a test suite including at least one test case.

17. The XML comparator of claim 16, wherein the software application includes a software application written in a Java programming language.

18. The XML comparator of claim 14, wherein the test bench is coupled to an XML reporter.

* * * * *